United States Patent [19]
DeVoe

[11] Patent Number: 5,152,542
[45] Date of Patent: Oct. 6, 1992

[54] CLASSROOM TRAVELER CART

[76] Inventor: Armand H. DeVoe, 318 Cowpath Rd., Lansdale, Pa. 19446

[21] Appl. No.: 502,809

[22] Filed: Apr. 2, 1990

[51] Int. Cl.⁵ .............................................. B62B 3/02
[52] U.S. Cl. ............................ 280/47.371; 280/79.11
[58] Field of Search ............ 280/47.34, 47.35, 47.371, 280/79.11, 79.3, 651; 248/646, 676; 108/61, 106, 108, 111

[56] References Cited

U.S. PATENT DOCUMENTS

| D. 185,457 | 6/1959 | Molitor | 280/47.35 |
|---|---|---|---|
| 996,636 | 7/1911 | Gabriel | 280/47.35 |
| 2,886,186 | 5/1959 | Hamilton | 280/47.35 |
| 2,981,549 | 4/1961 | Hotton | 280/47.35 |
| 4,542,909 | 9/1985 | Littwin et al. | 280/47.35 |

FOREIGN PATENT DOCUMENTS 3316896 11/1984 Fed. Rep. of Germany ... 280/47.35

Primary Examiner—Andres Kashnikow
Assistant Examiner—Richard Camby
Attorney, Agent, or Firm—Joseph W. Molasky

[57] ABSTRACT

A cart designed for use by personnel who travel from place to place with heavy equipment. The cart is characterized by external shelving suitable for use with equipment that requires an external power source, and internal shelving for general storage purposes. The design allows easy assembly from a knock-down version of the cart.

5 Claims, 3 Drawing Sheets

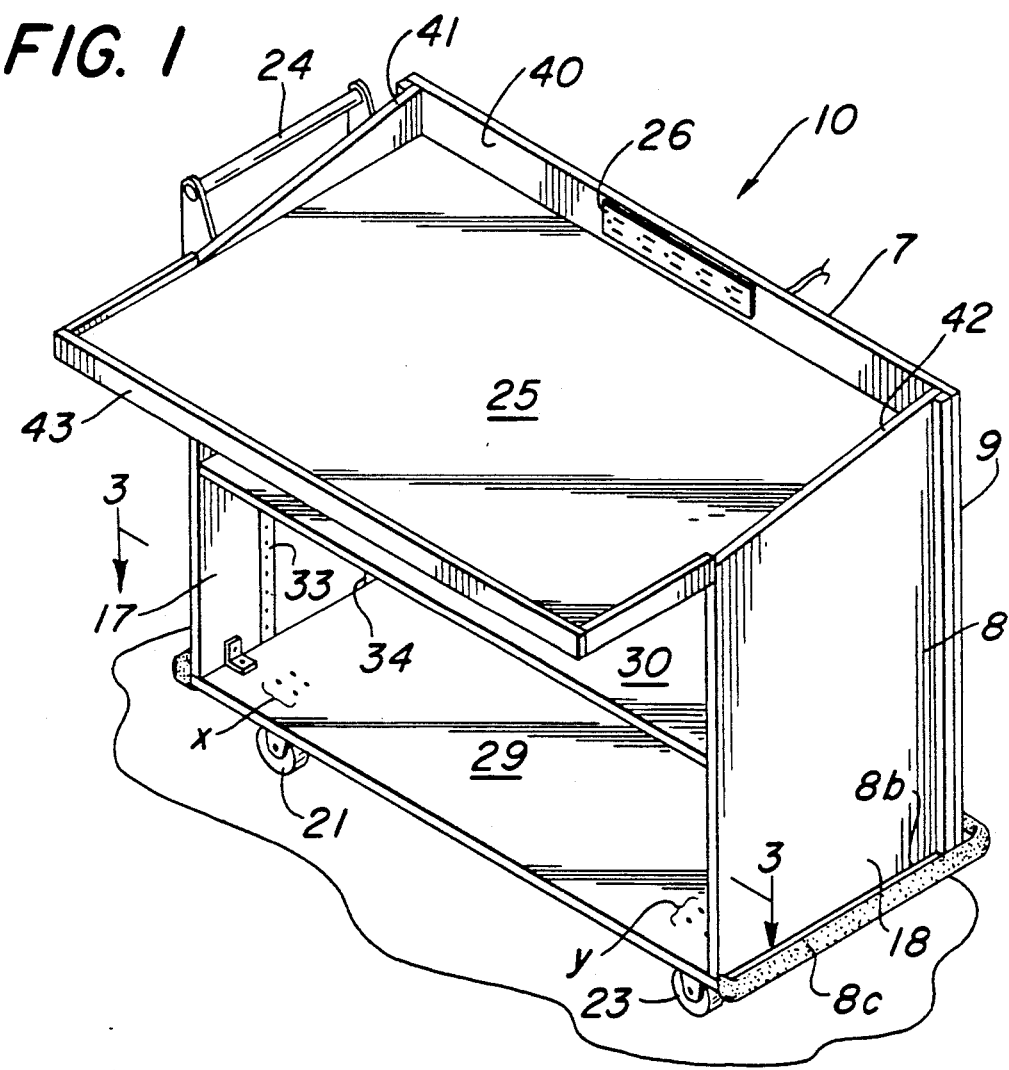
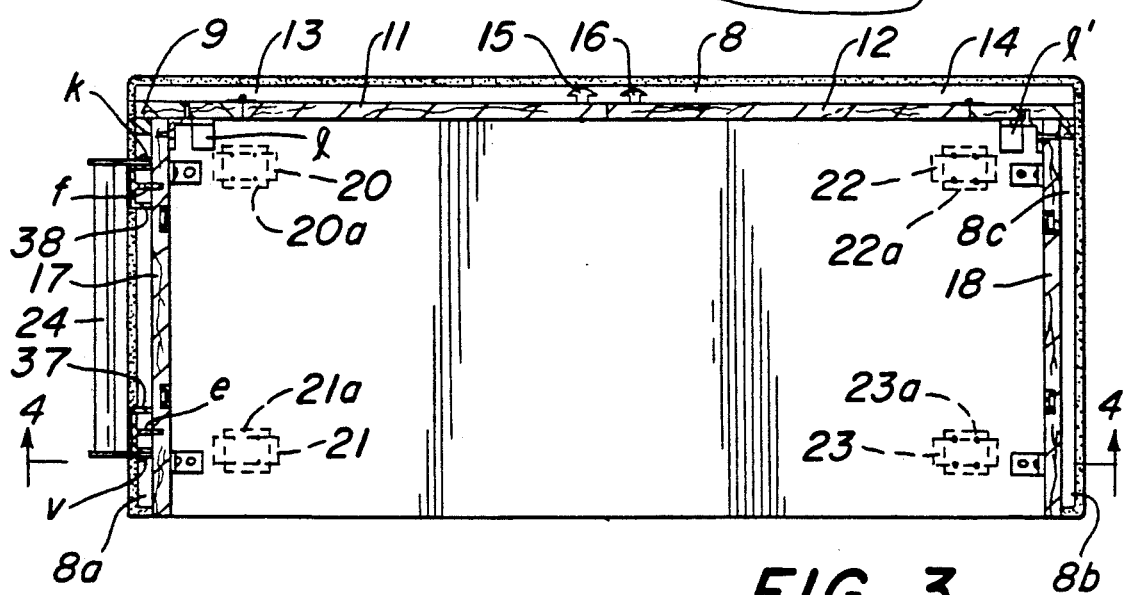

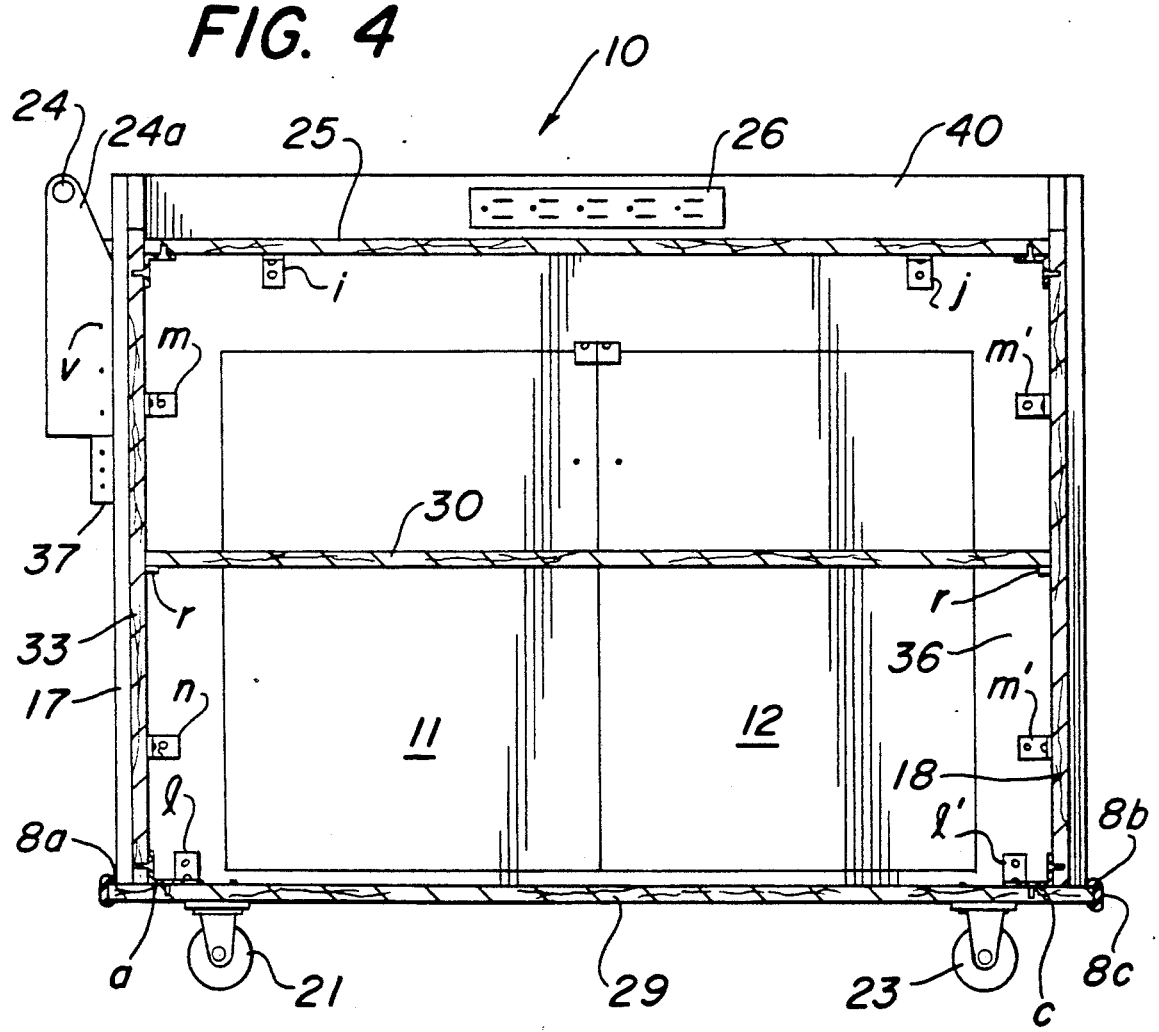

CLASSROOM TRAVELER CART

BACKGROUND OF THE INVENTION

1. Field of the Invention

This invention relates in general to the art of storage equipment and, in particular, to storage equipment which is suitable for itinerant personnel who are required to carry heavy and bulky equipment from place to place.

2. Description of the Prior Art

It has become a burdensome task for school personnel such as music teachers to move to different classrooms during the instructional day carrying necessary equipment which may comprise instrumental, electronic and reference materials. Music teachers have become more mobile in conducting their day-to-day teaching tasks due to the lack of classroom availability due generally to a burgeoning school enrollment.

The market place has addressed the above-described needs of music teachers but they are found to be unsatisfactory as a result of the ease with which prior art carts may be tipped over.

Since the above problem has not been satisfactorily addressed with respect to the needs of music teachers, they have had to rely upon aides, students and their own devices to provide the necessary support that is required to facilitate their task.

The present invention has been designed to allow the mobile music teacher to operate in an independent mode without relying upon others for assistance. Accordingly, a cart has been devised which is easily maneuverable, has adequate capacity for internal and external storage purposes and includes a power source for providing energy to support electronic equipment.

SUMMARY OF THE INVENTION

The cart of this invention, when used by music instructors, is designed to allow for facile transportation of electronic keyboards, amplifiers, woodwind instruments and peripherals in a school setting that does not have a music facility available.

An adjustable handle is provided upon one end to allow for easy steering and pushing of the cart from class to class by either the adult instructor or a student aide. A caster system having wheels that are pivotable in the rear and non-pivotable in the front is furnished in conjunction with the adjustable handle to aid in the facile steering and pushing of the cart.

A top shelf, which is edged for safety purposes and to prevent accidental sliding of equipment onto the floor, is at a height to permit easy access to an electronic keyboard by the instructor during the teaching of a lesson. Alternating current is also furnished to power the electronic keyboard as well as other electrical equipment.

An additional shelf that is adjustable in height is located under the top shelf and serves to store materials required by the teacher during the execution of his/her work. Doors are provided in the front of the cart to hide the shelf contents whereas the back is left open for easy access.

It is therefore an object of this invention to provide a new and improved travel cart.

It is another object of this invention to provide a traveling cart that is particularly suited for use by music teachers.

It is still another object of the invention to provide a traveling cart for easy assembly and disassembly from its component parts.

BRIEF DESCRIPTION OF THE DRAWINGS

FIG. 1 is a perspective view of the mobile cart of the invention.

FIG. 3 is a sectional view taken along line 3—3 of FIG. 1.

FIG. 4 is a sectional view taken along line 4—4 of FIG. 3.

DESCRIPTION OF THE PREFERRED EMBODIMENTS

Figure 2:
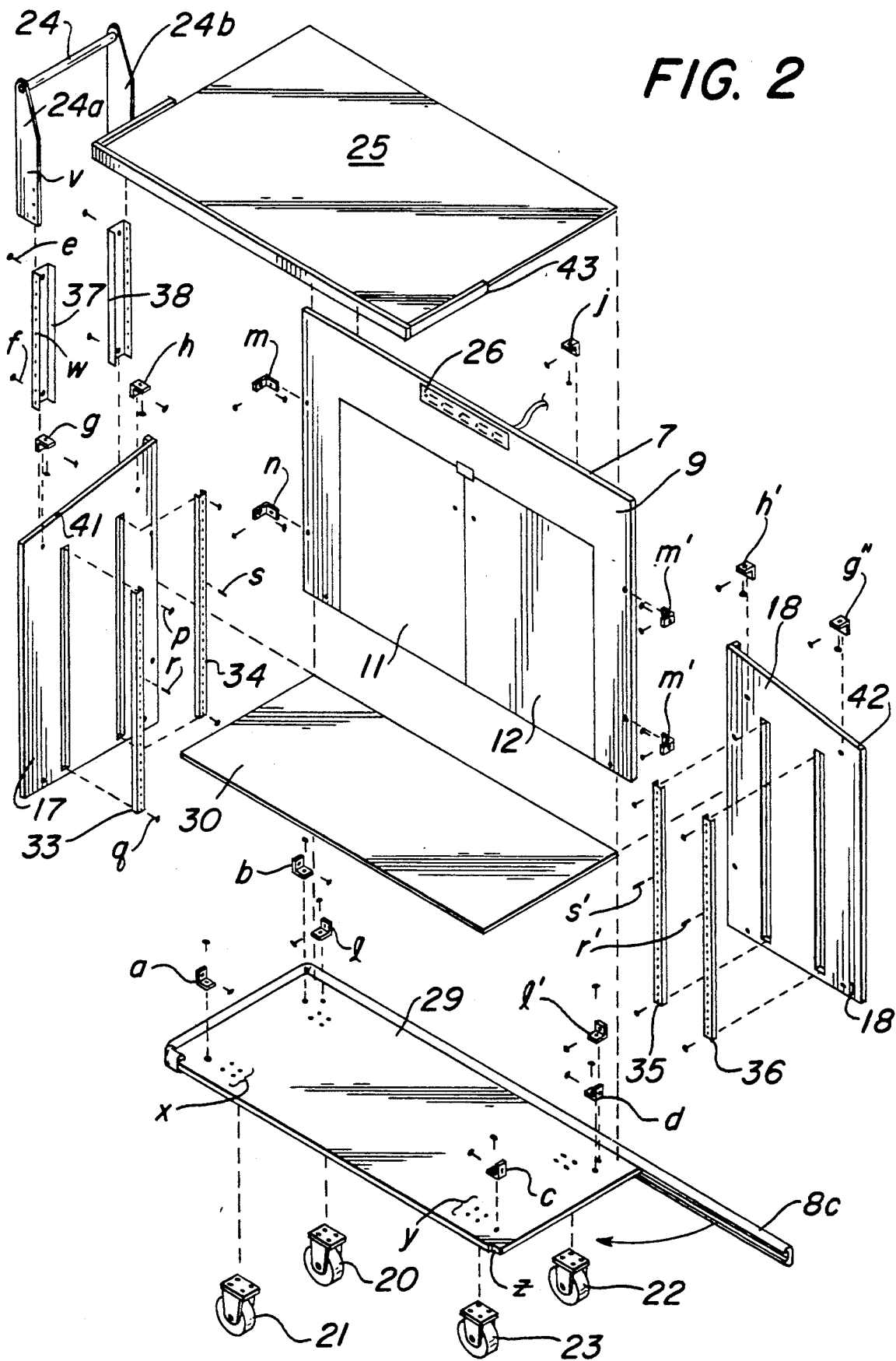
FIG. 2 is an exploded view of the various parts and their location with respect to one another.

Referring now to the drawings, there is depicted in FIG. 1 the cart device 10 of the invention, which is found particularly useful to music teachers who must move from classroom to classroom during the instructional day. Normally, schools of a district include a room for music instruction where the assigned teacher remains throughout the day and the students are assigned there during various time periods. This is the conventional practice in the music arts, since the teacher maintains all instructional materials, text books and keyboard instruments in one location. However, when there is a shortage of classroom space the mobile music instructor is inconvenienced and burdened as a result of the various items that must be carried from place to place.

As may be seen in FIG. 3, the cart 10 is characterized generally by a box-like structure, which has a rectangular cross section of eighteen and one-half inches in width and forty-three inches in length. The topmost shelf area 25 of the cart is three feet in height, and is forty-one and one-half inches in length by twenty-nine inches in width. In addition, the shelf 25 includes an outwardly extending surface of eight and one-half inches for supporting various electronic equipment, which requires a source of power from multiple receptacle 26. The outwardly extending surface of top area 25 serves as a convenient repository for an electronic keyboard which may be easily and conveniently accessed by the instructor. The top surface 25 is surrounded by edging 40,43 which prevents the equipment from falling onto the floor due to an accidental bumping or disturbance.

Wheels are provided in the form of casters 21, 23 for moving the cart 10 from place to place with minimum effort. To assist in this endeavor a handle 24 is attached to a side panel 17 for steering, pulling and pushing purposes. In order to prevent damage due to unintentional bumping into moldings and door frames, a material 8c such as rubber or the like is furnished around three of the four sides along the bottom of the cart 10. In particular, the bumper material 8c is applied to an extending ledge whose purpose will be clearer in discussions relating to other figures of the drawings. The cart 10 also includes an adjustable shelf 30 by means of typical side mounted brackets 33, 34.

The box-like cart 10, as seen in the exploded view of FIG. 2, includes in addition to the top shelf surface 25: a bottom side panel 29, which also serves as a stationary shelf; sides 17, 18 and front panel 9, which incorporates doors 11, 12; in addition, the adjustable shelf 30 is integrated into the cart structure below the top shelf 25. The front panel 9 is the side that faces the students and hides the materials located within the cart upon shelves 29, 30 so that they do not become a distraction. The back side of the cart, which is the side where the teacher stands facing the students, is open to allow for easy access to the stored materials located upon shelves 29, 30.

In order to allow the cart 10 to be moved from classroom to classroom, casters 20, 21, 22, 23 are located at its four corners. The casters 22, 23 which are located under the front side, are a non-swivable type whereas the casters positioned under the rear side are swivable. This allows the person, who positions himself/herself behind the push-steer handle 24, to guide the cart 10 through doors with relative ease.

The view of FIG. 2 further illustrates how the various panels and shelves 9, 17, 18, 25, 29 and 30 are joined into an integral unit by means of angle brackets and screws required for holding the various parts together. The cart 10 is essentially built upon the shelf platform 29 where two sets of quadruple holes are formed, and one of the rear set is represented by the holes X and one front set by the holes Y. The quadruple holes of the platform 29 are arranged for aligning with the quadruple holes of the casters 20, 21, 22 and 23 when the latter are fixed to the cart 10. As previously discussed, the front casters 22, 23 are non-swivable and are located upon that part of the cart 10 that leads when moved from place to place or through a door; on the other hand, the casters 20, 21 are swivable to allow for steering by the pusher or steerer of the cart.

The side panels 17, 18 are attached to the shelf platform 29 by means of the right angled brackets a, b, c, d and appropriate screws. As may be noted, the panels 17, 18 are cut at an angle upon respective edges 41, 42 for reasons that will be clear in paragraphs hereinbelow. The panels 17, 18 are located slightly inward a distance as represented by the notch Z to provide a ledge 8a, 8b (see FIG. 3). The edge of the ledges 8a, 8b are covered with a rubberized bumper 8c in order to protect the cart as well as doorways and furniture from damage.

Positioned upon the respective inside surfaces of sides 17, 18 are strips 33, 34, 35 and 36 which include holes at either end for attachment by means of typical screws p, q. Adjustment pins such as pins r, s, r', s' are provided for insertion into holes of the strips 33, 34, 35 and 36 for support of the shelf 30 and to allow for easy adjustment in height.

The cart 10 including the shelving 29, 30 is enclosed in the front by the panel 9 which includes the doors 11, 12. The front panel 9 is also positioned inwardly to furnish a ledge 8 (see FIG. 3) whose width dimension prevents the door knobs 15, 16 from being damaged as the cart passes through a narrow entranceway. The panel 9 is provided with the multiple A.C. outlet 26 and is attached to the platform 30 and side panels 27, 28 via the typical angle brackets 1, 1', m, m', n, n'.

The top surface or shelf 25 is attached to the side panels 17, 18 and the front panel 9 by way of the angle brackets g, g', h, h', i (see FIG. 4), j and associated screws. The shelf 25 is positioned below the top edges 7, 41, 42 of respective sides 9, 17 and 18 when fixed in position as may be seen by referring to FIG. 1. As was previously discussed, the shelf 25 is located with respect to sides 9, 17, 18 in a manner to provide edging 40 along the front and sides along the upper surface of shelf 25; as understood, the edging 40 in combination with the edging 43 prevents the various equipment located upon the shelf 25 from falling onto the floor, which may be dangerous.

In order to have the facility for pushing the cart 10 from place to place and through narrow entranceways, a handle bar 24 is provided which is adjustable in height. The handle bar 24 is round in cross section and is positioned between the side members 24a, 24b for locating along the connector pieces 37, 38 as may be further seen and understood in FIGS. 3, 4. The connector pieces 37, 38 which include a plurality of holes w along the outside surfaces are held in position against the side panel 17 by means of typical screw-type fasteners e, f. Appropriate holes v are provided along the cross members 24a, 24b for aligning with the holes w of the connector pieces 37, 38. Pins v, k (see FIG. 3) are provided for holding and maintaining the handle 24 at an appropriate and comfortable height for the instructor who is moving from classroom to classroom.

Referring to FIG. 3, which is a cross sectional view taken along line 3—3 of FIG. 1, there is clearly represented the relationship of the outline of the sides 9, 17, 18 with respect to outwardly projecting ledges 8, 8a, 8b; furthermore, the sectional view of FIG. 3 illustrates the protective rubberized member 8c that is attached to the ledges to prevent damaging walls, doorways and furniture when the cart 10 is in transit.

In the sectional view of FIG. 4 a view is taken from the back of the cart 10 where the music instructor is usually positioned. Since the back of the cart is open the ease with which the internal shelves 29, 30 can be accessed is clearly visible. The back of the doors 11, 12 positioned on the front of the cart are also seen and clearly illustrate how materials on the shelves 29, 30 are hidden from view from those sitting in front in order to avoid being distracted. The rubberized bumper 8c may also be viewed with respect to the overhang or ledge 8a, 8b which are employed for protective purposes.

The adjustability via the alignment holes w in the side member 24a, 24b and connector pieces 37, 38 of the handle 24 for pushing, pulling and steering the cart 10 is also clearly visible to the observer.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. An apparatus comprising:
    (a) a cart device having a front and a pair of side planar sections as well as a rearward opening and a generally rectangular cross section for transporting mechanical and electronic items from place-to-place;
    (b) a plurality of shelves located in said device wherein one such shelf comprises an uppermost surface of said cart, and at least one other shelf being located under said top shelf and adjustable in an upward and downward direction with respect to said side sections such that all of said shelves are accessible from said front and rearward sides;
    (c) door means,
    (d) said door means being located in said front side for hiding any contents located upon said under shelf from viewers; and
    (e) said topmost shelf being integrally formed and extending outwardly from said rectangular cross section laterally of said rearward opening and at a height which is easily accessible to the hands of a person in a normal standing position;
(f) said front and said pair of side planar sections extending above said topmost shelf and forming an edge surrounding said topmost surface to prevent accidental falling upon the ground of items placed upon said shelf;
(g) a plurality of electrical outlets attached to said edge for providing alternating current power for said items;
(h) means attached to the bottom of said cart for easily steering said device from place-to-place; and
(j) means surrounding at least three sides of said device for preventing damage to said cart and to various stationary or movable items in the path of said cart when moving from location to location.

2. The apparatus in accordance with claim 1 and further comprising:
a bar handle adjustable in a vertical direction located upon an outside surface of said cart and against one of the shorter sides of said rectangular cross-sectioned cart for steering said apparatus.

3. The apparatus in accordance with claim 2 and further comprising:
two sets of casters located upon the corners of the undersurface of said cart, wherein one set of casters is located under said handle pivot and are able to pivot, whereas the remaining casters are located opposite said handle and do not pivot.

4. The apparatus in accordance with claim 3 and further comprising:
a member including pivotable doors for attaching to said device for enclosing one side of said shelf under said topmost shelf.

5. A kit assembly for a cart comprising:
(a) first and second substantially equal dimensioned rectangular members;
(b) a front and a rear set of equally dimensioned casters wherein said rear set is swivable and said front set is non-swivable, said sets of casters being attachable to said first rectangular member through holes provided therein;
(c) first and second four-sided members having one side cut at an angle and adapted to be joined to said first and second rectangular members with angle brackets and screws;
(d) first and second adjustable brackets for vertical positioning upon said first and second side members to allow said second rectangular member to become adjustable;
(e) third and fourth adjustable connectors for attachment to the outside of said respective first or alternately second side members;
(f) a handle for joining with said third and fourth connectors for adjusting to a comfortable height;
(g) door means;
(h) a front panel for receiving said door means and adapted for enclosing one side of said second adjustable shelf;
(i) an integrally formed rectangular shelf having dimensions which may be joined to said first and second side members and to said front panel below their respective top edges, said rectangular shelf having dimensions which cover said second rectangular member and extend outwardly beyond the dimensions of said cart and directly opposite from said front panel;
(j) edge members extending above one side and partially along two adjacent sides of said rectangular shelf; and
(k) a female electrical connector attached to one of said edge members for receiving male electrical connectors;
(l) angle bracket and screws for holding and attaching said rectangular shelf to said front panel and said first and second side members.

* * * * *